United States Patent
Philipp et al.

(10) Patent No.: US 6,573,204 B1
(45) Date of Patent: Jun. 3, 2003

(54) CLEANING CLOTH

(75) Inventors: Dieter Philipp, Schriesheim (DE); Jochen Wirsching, Birkenau (DE); Steffen Kremser, Heddesheim (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/547,643

(22) Filed: Apr. 12, 2000

(30) Foreign Application Priority Data

Apr. 16, 1999 (DE) .......................... 199 17 275

(51) Int. Cl.⁷ .............................. B32B 5/26; B32B 7/08; D04H 5/06; D04H 5/02

(52) U.S. Cl. ................. 442/346; 442/341; 442/344; 442/347; 442/350; 442/351; 442/361; 442/387; 442/388; 442/389; 442/392; 442/402; 442/403; 442/411

(58) Field of Search .................. 442/340, 341, 442/344, 346, 347, 350, 351, 381, 387, 388, 389, 415, 361, 392, 402, 403, 409, 411

(56) References Cited

U.S. PATENT DOCUMENTS

| 4,100,324 A | 7/1978 | Anderson et al. |
| 4,145,464 A | 3/1979 | McConnell et al. |
| 4,604,313 A | 8/1986 | McFarland et al. |
| 4,784,892 A | 11/1988 | Storey et al. |
| 5,508,102 A | 4/1996 | Georger et al. |
| 5,641,563 A * | 6/1997 | Truong et al. ............... 442/327 |
| 5,759,926 A | 6/1998 | Pike et al. |
| 6,200,669 B1 * | 3/2001 | Marmon et al. ............ 428/198 |

FOREIGN PATENT DOCUMENTS

| DE | 30 35 038 | 4/1982 |
| DE | 89 16 164 | 7/1994 |
| EP | 0 080 383 | 6/1983 |
| EP | 0 333 211 | 9/1989 |
| EP | 0 333 212 | 9/1989 |
| EP | 0 357 496 | 3/1990 |
| EP | 0 423 619 | 4/1991 |
| EP | 0 569 860 | 11/1993 |
| EP | 0865755 A1 * | 9/1998 |
| JP | 06-101148 * | 4/1994 |

OTHER PUBLICATIONS

JP 06–101148, Nakamura et al., Apr. 12, 1994. (English Translation).*

* cited by examiner

Primary Examiner—Terrel Morris
Assistant Examiner—Jenna-Leigh Befumo
(74) Attorney, Agent, or Firm—Kenyon & Kenyon

(57) ABSTRACT

A cleaning cloth having a nonwoven structure for wet, damp and/or dry cleaning, the cleaning cloth being made from micro staple fibers of at least two different polymers and from absorbent secondary staple fibers bound into the micro staple fibers and securely retained therein.

27 Claims, 2 Drawing Sheets

CLEANING CLOTH

FIELD OF THE INVENTION

The invention relates to a cleaning cloth having a nonwoven structure for wet, damp and/or dry cleaning.

BACKGROUND OF THE INVENTION

Cleaning cloths are generally familiar, and are provided for removing dirt from the surface of an object and for taking up the dirt itself. To achieve both objectives, a cleaning cloth must have very good cleaning efficiency as well as sufficient abrasion resistance, and must be provided with ample pore volume, in order to store the dirt.

DE OS 30 35 038 deals with a cleaning cloth exhibiting good performance properties. It is made from porous microfibers of a polymer material which have an essentially non-porous fiber core and an open-pored, foamed fiber sheath. Such a cleaning cloth made of polymer material has particularly high mechanical resistivity, which has a positive effect with respect to resistance against wear. Improved resilience and enlarged bulk with improved soil pick-up capacity are achieved by a mixture of microfibers with staple fibers or filaments.

The U.S. Pat. No. 4,145,464 deals with another embodiment of a cleaning cloth. In that case, the cleaning cloth is produced from a mixture of cellulose and synthetic fibers, is covered on both sides by cellulosic layers, and is bonded by mutually bonding all the fibers in locally separate zones. However, such a cleaning cloth has inadequate mechanical stability, since the cellulose fibers have a relatively short length of less than 6.35 mm, resulting in unsatisfactory abrasion resistance. Following even a relatively brief period of use, fiber components can become detached and deposit in the form of dust-like particles or fuzz on the surface to be cleaned.

Furthermore, the European Patent 0 423 619 describes a cleaning cloth which is formed of a plurality of layers, and specifically of a layer made of synthetic filaments, so-called filament fibers, which has a layer of staple fibers mixed with natural fibers on at least one of its sides. The amount of natural fibers is stated at 15 to 70%. High stability is attained with this cleaning cloth, particularly due to the bottom layer or middle layer of synthetic filaments. However, the short natural fibers in the covering layer(s) lead to unsatisfactory abrasion resistance, similar to the case in the aforementioned U.S. Pat. No. 4,145,464.

SUMMARY OF THE INVENTION

The object of the invention is to provide a cleaning cloth for wet, damp and/or dry cleaning which exhibits high abrasion resistance and has large pick-up volume for the rubbed-off dirt. In addition, it should be as firm as possible, offer good cleaning efficiency and, moreover, be pleasant to handle.

The objective is achieved according to the invention in a cleaning cloth of the type indicated at the outset, in that the cleaning cloth is made from micro staple fibers of at least two different polymers, and from absorbent secondary staple fibers. In such a cleaning cloth, the high cleaning efficiency and stability of the micro staple fibers and their abrasion resistance are combined with the high absorbency of the secondary staple fibers. The secondary staple fibers are bound into the micro staple fibers and are securely retained therein.

The micro staple fibers are multi-component split fibers, particularly bicomponent split fibers. They are formed predominantly of polymers based on polyester and polyamide. A wide field of possible variants exists here. The split fibers or fibrillated fibers are preferably selected from the standpoints of economics and process engineering.

Before being split, the titer of the multi-component fibers lies at 1.7 to 3.0 dtex. The titer of the split fibers is below 1 dtex, preferably below 0.2 dtex.

Staple fibers produced from natural fibers, in particular from cellulose fibers, from cotton, from viscose, lyocell and/or other absorbent staple fibers such as polyvinyl alcohol fibers, are used as secondary staple fibers. The titer of the secondary staple fibers lies at 1.0 to 3.0 dtex. These extrusion-spun staple fibers are perceptibly firmer than customary natural fibers.

To achieve a pore volume which is as large as possible, it is beneficial if the cleaning cloth is formed from at least two superposed nonwoven layers. In this context, it is particularly favorable if one of the nonwoven layers is made of micro staple fibers and absorbent secondary staple fibers, and the other nonwoven layer is formed from polymer tertiary staple fibers, in particular from a thermoplastic and absorbent secondary staple fibers. This nonwoven layer, produced using tertiary staple fibers, is particularly voluminous. Thus, advantage is taken here of the high cleaning efficiency and abrasion resistance of the micro staple fibers on the one side of the cleaning cloth in conjunction with the exceptional volume of the tertiary staple fibers and of the secondary staple fibers on the other side of the cloth. The absorption capacity is increased by the secondary staple fibers. The particularly preferred exemplary embodiment provides for using a nonwoven layer made of polymer tertiary staple fibers and absorbent secondary staple fibers as a middle layer which is faced on each of its sides by a covering nonwoven layer made of micro staple fibers and absorbent secondary staple fibers. In this cleaning cloth, the two outer layers which come in contact with the object to be cleaned exhibit high abrasion resistance, while the middle layer has a particularly voluminous bulk with a high absorptive capacity. Staple fibers made of a polyamide, having a titer that is customary for such fibers and lies above the titer of the microfibers, are preferably used as tertiary staple fibers.

The preferred manner of producing a cloth made of a plurality of nonwoven layers is to first form individual nonwoven layers and to join them to one another. In this context, each nonwoven layer can already be provided with the secondary staple fibers. However, it is also possible to initially provide only the tertiary staple fiber layer with the secondary staple fibers, and to bring the microfiber layer onto it without secondary fibers, and to introduce the secondary staple fibers into the micro staple fiber layer(s) as well by needle-punching the layers together.

The individual nonwoven layers are joined together by needle-punching, tanglelacing (i.e., intermingling) or laminating. Such processes are known per se. Particularly good results are attained if the nonwoven layers are interconnected by spot-fusing. This yields an open-work surface which increases the cleaning power of the cloth. When working with spot-fusing, the individual nonwoven layers can be bonded through fusion zones, using heat and pressure. However, it is also possible to bond the surfaces of the cleaning cloth through fusion zones, particularly by calendering.

The mass per unit area of the cleaning cloth is generally 75 to 250 g/sqm, preferably 120 to 180 g/sqm. For a three-layer cleaning cloth composed of a middle layer made of tertiary staple fibers and secondary staple fibers, and two covering layers made of micro staple fibers and secondary staple fibers, the mass per unit area of the middle layer is selected such that it amounts to 40 to 80% of the total mass per unit area. In this case, it is beneficial if the masses per unit area of the covering layers are identical.

The portion of micro staple fibers in the covering layer(s) outweighs the portion of secondary staple fibers. The portion of micro staple fibers lies between 70 and 98%, preferably between 70 and 80%.

In the middle layer, the portion of secondary staple fibers outweighs the portion of tertiary staple fibers. It is between 70 and 100%, preferably between 70 and 80%.

BRIEF DESCRIPTION OF THE DRAWINGS

The invention is explained in greater detail on the basis of two exemplary embodiments depicted in the Figures, in which.

DETAILED DESCRIPTION OF THE INVENTION

Figure 1:
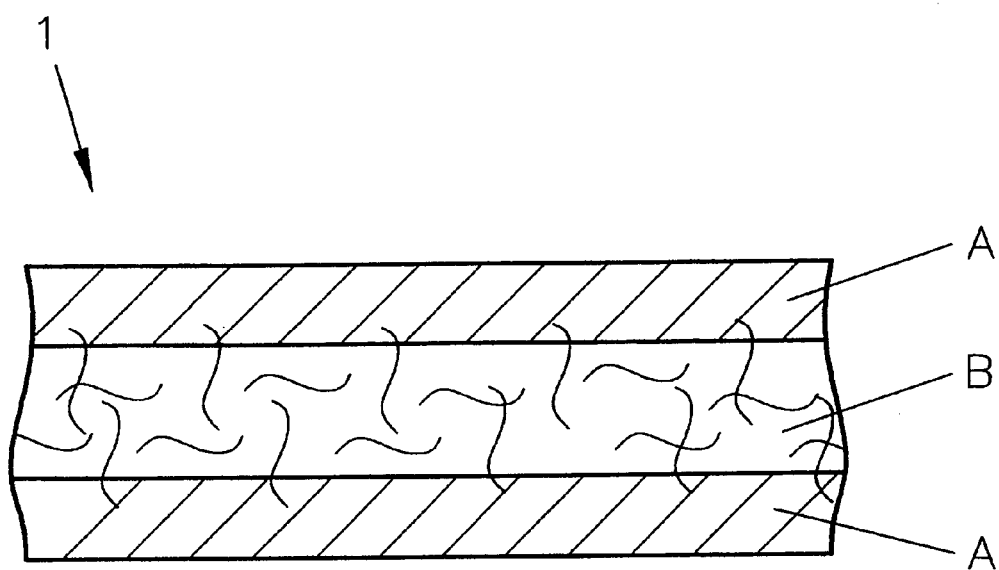
FIG. 1 shows, in section, a cutaway portion from a cleaning cloth having three nonwoven layers.

FIG. 1 shows, enlarged, a section taken through a cutaway portion of a cleaning cloth 1 made of three nonwoven-fabric layers A, B, A. Middle layer B is made of synthetic tertiary staple fibers mixed with secondary staple fibers, while the two covering layers A, A are formed of micro staple fibers and secondary staple fibers. The compositions of both covering layers A, A are identical. Nonwoven-fabric layers A, B, A are water-jet needled. In this manner, the individual fibers are tangled together and the micro staple fibers are at least partially split. The result is a tight interconnection of the various fibers and nonwoven layers to one another.

Figure 2:
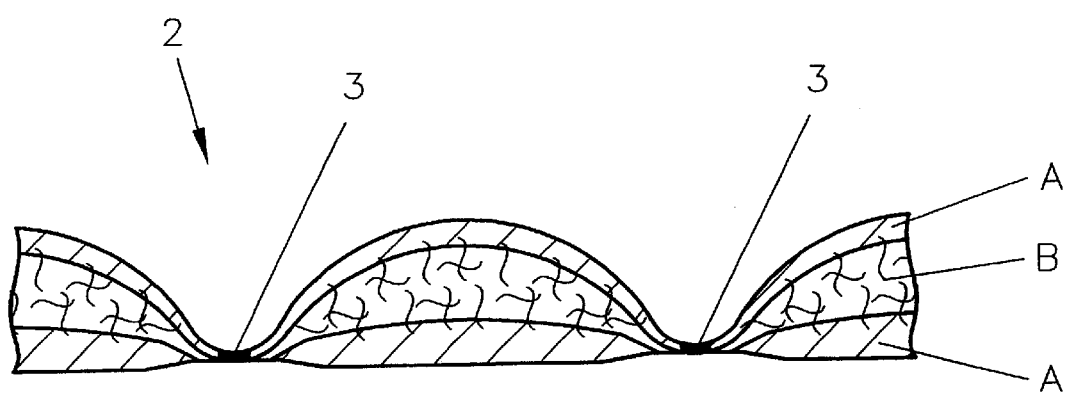
FIG. 2 shows, in section, a cutaway portion from a cleaning cloth made of three nonwoven layers joined together by spot-fusing.

FIG. 2 shows, likewise in section, a cutaway portion of a three-layer cleaning cloth 2. The three nonwoven-fabric layers A, B, A have the same composition as layers A, B, A of FIG. 1. However, the layers are spot-fused at locations 3 preselected in a pattern. This yields a higher cleaning efficiency of cloth 2. The spot-fusing is achieved by calendering the nonwoven layers, in that they are passed together through two rolls, one of the rolls being provided with knobs distributed in a pattern, and the other roll having a smooth surface. This results in the one-sided fusion zones of nonwoven layers A, B, A at locations 3 of cloth 2. Due to this measure, individual layers A, B, A are firmly joined to one another and, in addition, the thermoplastic fibers of the individual layers are bonded together by the heated rolls, at least at the surface of the cloth, and because of this, the secondary staple fibers are embedded as well. Before being calendered, nonwoven layers A, B, A, are water-jet needled to thus attain a particularly strong joining of the fibers and layers among themselves. In addition, the micro staple fibers are split during the water-jet treatment.

What is claimed is:

1. A cleaning cloth having a nonwoven structure for wet, damp and/or dry cleaning consisting of, as three separate single layers:

i) a first middle nonwoven layer comprising polymer tertiary staple fibers of polyamide and absorbent secondary staple fibers; and ii) two second nonwoven outer layers each comprising micro staple fibers of polyester and polyamide, wherein the micro staple fibers are bicomponent split fibers, and absorbent secondary staple fibers bound into the micro staple fibers; at least a portion of the cleaning cloth being abrasion resistant and porous; wherein the layers are joined to each other.

2. The cleaning cloth as recited in claim 1, wherein, before being split, the titer of the multi-component fibers is between 1.7–3.0 dtex.

3. The cleaning cloth as recited claim 1, wherein the titer of the split fibers lies below 1 dtex.

4. The cleaning cloth as recited in claim 3, wherein the titer of the split fibers lies below 0.2 dtex.

5. The cleaning cloth as recited in claim 1, wherein the secondary staple fibers are natural fibers.

6. The cleaning cloth as recited in claim 5, wherein the secondary staple fibers are selected from the group consisting of cellulose fibers, cotton, viscose and lyocell.

7. The cleaning cloth as recited in claim 5, wherein the secondary staple fibers are absorbent staple fibers of polyvinyl alcohol.

8. The cleaning cloth as recited in claim 1, wherein the titer of the secondary staple fibers is 1.0 to 3.0 dtex.

9. The cleaning cloth as recited in claim 1, wherein the secondary staple fibers are introduced from the first nonwoven layer into the second nonwoven layers by needle-punching.

10. The cleaning cloth as recited in claim 1, wherein the first and second nonwoven layers are joined together by needle-punching, tanglelacing or laminating.

11. The cleaning cloth as recited in claim 1, wherein the first and second nonwoven layers are joined together by spot-fusing.

12. The cleaning cloth as recited in claim 1, wherein the first and second nonwoven layers are bonded through fusion zones, using heat and/or pressure.

13. The cleaning cloth as recited in claim 1 having surfaces, wherein thermoplastic fibers of each layer are bonded together by calendering with use of heated rolls.

14. The cleaning cloth as recited in claim 1, wherein the cleaning cloth has a mass per unit area of 75 to 250 g/sqm.

15. The cleaning cloth as recited in clam 14, wherein the cleaning cloth has a mass per unit area of 120 to 180 g/sqm.

16. The cleaning cloth as recited in claim 1, wherein the first and second non-woven fabric layers are water-jet needled so that individual fibers are tangled together.

17. A cleaning cloth having a nonwoven structure for wet, damp and/or dry cleaning, consisting of, as three separate single layers:

i) a middle nonwoven layer comprising polymer tertiary staple fibers of polyamide and absorbent secondary staple fibers; and ii) two outer nonwoven covering layers having the same composition, each of the two outer nonwoven layers comprising micro staple fibers of polyester and polyamide, wherein the micro staple fibers are bicomponent split fibers, and absorbent secondary staple fibers bound into the micro staple fibers; at least a portion of the cleaning cloth being abrasion resistant and porous; wherein the middle and outer layers are joined to each other.

18. The cleaning cloth as recited in claim 17, wherein the mass per unit area of the middle layer is 40 to 80% of the total mass per unit area.

19. The cleaning cloth as recited in claim 17, wherein the cleaning cloth has a mass per unit area of 75 to 250 g/sqm and the masses per unit area of the outer nonwoven covering layers are identical.

20. The cleaning cloth as recited in claim 17, wherein the amount of micro staple fibers outweighs the amount of secondary staple fibers in the covering layers.

21. The cleaning cloth as recited in claim 17, wherein the amount of micro staple fibers in the covering layers is 70 to 98%.

22. The cleaning cloth as recited in claim 21, wherein the amount of micro staple fibers in the covering layers is 70 to 80%.

23. The cleaning cloth as recited in claim 17, wherein the amount of secondary staple fibers outweighs the amount of tertiary staple fibers in the middle layer.

24. The cleaning cloth as recited in claim 17, wherein the amount of secondary staple fibers in the middle layer is 70 to 100%.

25. The cleaning cloth as recited in claim 24, wherein the amount of secondary staple fibers in the middle layer is 70 to 80%.

26. A cleaning cloth having a nonwoven structure for wet, damp and/or dry cleaning, consisting essentially of three separate single layers:
   i) a middle nonwoven layer comprising polymer tertiary staple fibers of polyamide and absorbent secondary staple fibers; and
   ii) two outer nonwoven covering layers having the same composition, each of the two outer nonwoven layers comprising micro staple fibers of polyester and polyamide, wherein the micro staple fibers are bicomponent split fibers, and absorbent secondary staple fibers bound into the micro staple fibers; at least a portion of the cleaning cloth being abrasion resistant and porous; wherein the middle and outer layers are interconnected by spot-fusion in a predetermined pattern, to enhance cleaning power of the cloth.

27. A cleaning cloth having a nonwoven structure for wet, damp and/or dry cleaning, consisting of three separate single layers:
   i) a middle nonwoven layer comprising polymer tertiary staple fibers of polyamide and absorbent secondary staple fibers, wherein the amount of secondary staple fibers outweighs the amount of tertiary fibers in the middle layer; and
   ii) two outer nonwoven covering layers having the same composition, each of the two outer nonwoven layers comprising micro staple fibers of polyester and polyamide, wherein the micro staple fibers are bicomponent split fibers, and absorbent secondary staple fibers bound into the micro staple fibers, the amount of micro staple fibers outweighing the amount of secondary staple fibers in the covering layers, and at least a portion of the cleaning cloth being abrasion resistant and porous;
   wherein the middle and outer layers are interconnected by spot-fusion in a predetermined pattern, to enhance cleaning power of the cloth.

* * * * *